United States Patent
Ianev et al.

(10) Patent No.: US 9,763,214 B2
(45) Date of Patent: Sep. 12, 2017

(54) DEVICE AND METHOD FOR AUTONOMOUSLY PERFORMING AN IMPLICIT DETACH OPERATION

(71) Applicant: NEC Corporation, Minato-ku, Tokyo (JP)

(72) Inventors: Iskren Ianev, Berkshire (GB); Yannick Lair, Berkshire (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/387,817

(22) PCT Filed: Mar. 15, 2013

(86) PCT No.: PCT/JP2013/058887
§ 371 (c)(1),
(2) Date: Sep. 24, 2014

(87) PCT Pub. No.: WO2013/146832
PCT Pub. Date: Oct. 3, 2013

(65) Prior Publication Data
US 2015/0045027 A1    Feb. 12, 2015

(30) Foreign Application Priority Data
Mar. 30, 2012 (GB) .................................. 1205828.5

(51) Int. Cl.
*H04W 4/00* (2009.01)
*H04W 60/06* (2009.01)
*H04W 8/18* (2009.01)

(52) U.S. Cl.
CPC ........... *H04W 60/06* (2013.01); *H04W 4/001* (2013.01); *H04W 4/005* (2013.01); *H04W 8/18* (2013.01)

(58) Field of Classification Search
CPC ....... H04W 4/00; H04W 60/06; H04W 4/001; H04W 8/185
(Continued)

(56) References Cited

U.S. PATENT DOCUMENTS

| 2005/0174956 A1* | 8/2005 | Yi ....................... H04W 76/068 370/312 |
| 2009/0180447 A1 | 7/2009 | Kim et al. |

(Continued)

FOREIGN PATENT DOCUMENTS

| JP | 2012-227815 A | 11/2012 |
| WO | 2011/119680 A2 | 9/2011 |
| WO | 2011/124173 A2 | 10/2011 |

OTHER PUBLICATIONS

3GPP, "3rd Generation Partnership Project; Technical Specification Group Services and System Aspects; System Improvements for Machine-Type Communications; (Release 11)", Technical Report, 3GPP TR 23.888, V1.6.0, Nov. 2011.

(Continued)

*Primary Examiner* — Huy C Ho (57) ABSTRACT

A device can communicate wirelessly with another device in a wireless communication system and is arranged to receive configuring information defining a detach configuration. By using the detach configuration, the device can autonomously perform an implicit detach operation thus terminating a communication link between the device and the other device. Optionally, when the detach configuration includes an explicit detach mode, the device transmits an indicating signal indicating the detach operation. The indicating signal transmitted by the device may comprise a DETACH REQUEST message. Preferably the device can store the configuring information and can store program information, (Continued)

and can perform the detach operation by using the stored program information and the stored configuring information.

12 Claims, 8 Drawing Sheets

(58) Field of Classification Search
    USPC ...................................................... 455/435.1
    See application file for complete search history.

(56) References Cited

U.S. PATENT DOCUMENTS

| | | | |
|---|---|---|---|
| 2011/0201343 A1 | 8/2011 | Pinheiro et al. | |
| 2013/0016608 A1* | 1/2013 | Tiwari | H04W 4/22 370/230 |
| 2014/0003348 A1* | 1/2014 | Velev | H04W 60/06 370/328 |

OTHER PUBLICATIONS

Renesas Mobile Europe, "RAN Efficiency Improvement Schemes", 3GPP TSG-RAN WG2 Meeting #75, Aug. 22-26, 2011, Item 7.2, R2-114308.

Institute for Information Industry (III) et al., "Load Analysis for MTC Device in Idle Mode or Detached State", 3GPP TSG-RAN WG2 #70bis, Jun. 28-Jul. 2, 2010, R2-103619, Item 4.3.2.2.

British Search and Examination Report for GB application No. GB1205828.5, dated on Aug. 3, 2012.

3GPP, "3rd Generation Partnership Project; Technical Specification Group Core Network and Terminals; Mobile radio interface Layer 3 specification; Core network protocols; Stage 3 (release 11)", Technical Specification, 3GPP TS 24.008, V11.2.0, Mar. 2012.

International Search Report for Pot Application No. PCT/JP2013/058887, mailed on May 21, 2013.

3rd Generation Partnership Project; Technical Specification Group Radio Access Network; "Implicit Detach for Short Lived Sessions", Hitachi, 3GPP TSG SA WG2 Meeting #83, TD S2-110395, Feb. 14, 2011, Salt Lake City, USA, pp. 1-2. URL: http://www.3gpp.org/ftp/tsg_sa/WG2_Arch/TSGS2_83_Salt_Lake_City/Docs/S2-110395.zip.

Japanese Office Action for JP Application No. 2014547593 mailed on Feb. 7, 2017 with English Translation.

Chinese Office Action for CN Application No. 201380018048.9 issued on May 26, 2017 with English Translation.

* cited by examiner

DEVICE AND METHOD FOR AUTONOMOUSLY PERFORMING AN IMPLICIT DETACH OPERATION

This application is a National Stage Entry of PCT/JP2013/058887 filed on Mar. 15, 2013, which claims priority from British Patent Application 1205828.5 filed on Mar. 30, 2012, the contents of all of which are incorporated herein by reference, in their entirety.

TECHNICAL FIELD

The present patent application relates to wireless communication between devices, and to signalling associated with one or more wireless communication devices performing a detach operation whereby a wireless communication link is terminated. Aspects of the present invention will be described which allow the amount of such signalling associated with a detach operation to be reduced.

BACKGROUND ART

In the context of work performed by the Third Generation Partnership Project (3GPP) on System Improvements for Machine-Type Communications (SIMTC), 3GPP have introduced a feature called "time controlled" which addresses devices that can send or receive data only at certain defined time periods and potentially only need a very small time duration or interval to communicate with the network. The following is stated in Technical Report document 3GPP TR 23.888 v1.6.0, sub clause 5.9.1:
"Typically, an MTC User agrees with an operator on a predefined time period for a group of MTC devices. The time in which access is permitted is termed a 'grant time interval.' The network shall communicate the (altered) grant time interval to the MTC device and may also do so to the MTC Server and MTC User. A 'grant time interval' does not overlap with a 'forbidden time interval."

Such a grant time period or grant time interval is allocated to a device, in the above example a Machine-Type Communications (MTC) device, for the device to communicate during the grant time interval and not outside the grant time interval.

Technical Report document 3GPP TR 23.888 v1.6.0, sub clause 5.9.1 goes on to state (comments added in square brackets):
"For many applications, individual MTC devices do not need the total duration of this predefined time period to communicate with the MTC Server. Typically a 5-10 minutes communication window is sufficient for an individual MTC device" [to communicate with the network at any one occasion].

A network operator may therefore define a 'communication window' for a device to communicate, the communication window being within the grant time interval and having significantly smaller duration than the grant time interval. The network operator can find it advantageous to limit or minimize the duration of such a communication window, as will become apparent from the following description. Technical Report document 3GPP TR 23.888 v1.6.0, sub clause 5.9.1 goes on to state (comments added in square brackets):
"To avoid network overload [and peaks in signalling data and/or traffic data] . . . the communication windows of the devices shall be distributed over the defined time period [so that overlap of communication windows is minimized or avoided] . . . e.g. through randomization of the start time of the individual communication windows [within the grant time interval]. For a network operator, it can be beneficial that the MTC devices are not attached outside their [respective] communication window[s]. Therefore the network operator should be able to enforce detach of an MTC device from the network at the end of the communication window of a device."

There is one communication window allocated per wireless device/terminal, although there is no restriction that the device would communicate just once during the grant time interval. The grant time interval is the time during which the terminal is allowed to communicate. The time during which the terminal actually communicates with the network is called the 'communication window'. There is normally one such window per device but there could be more, depending on the MTC application (use case).

The grant time interval schedule (information) is delivered to the terminals by the network. As the same grant interval usually is delivered to a large number of MTC devices, it is beneficial that these MTC devices do not start communication at the same time (at the beginning of the grant time interval, for example) because that could cause temporary overloading of the channel used for the communication by the devices. The timings of the communication windows are randomised by the network. The network may deliver a randomisation information which indicates a time when each terminal is to start its communication (communication window), the communication windows being within the grant time interval.

Because of the introduction of communication windows, the times at which detach signalling occurs can be predicted.

With machine-type communications, signalling overload is expected to become a significant issue for networks as networks will face more and more connected devices due at least in part to the introduction of Machine Type Communications devices and this will result in potential signalling overload, simply due to the increased number of devices that can be attached to the network at any time. It would be beneficial to reduce the detach signalling which will likely occur at the end of the communication window (when communication windows are used) or at the end of the grant time interval (when communication windows are not used).

There are currently two different mechanisms in 3GPP systems for detaching a device (which could be any wireless terminal e.g. a mobile phone, fixed terminal or MTC device). Although these mechanisms are described herein in relation to a 3GPP system (e.g. GSM/GPRS, UMTS, Evolved Packet System (EPS)), it should be understood that other non-3GPP wireless communication systems have similar mechanisms for performing a detach operation or an equivalent of a detach operation, and aspects of the present invention described herein can apply equally to such other systems. The 3GGP mechanisms can be summarized as follows:
1) In a device-originated detach procedure, the device sends a DETACH REQUEST message to a network, and the network may acknowledge the DETACH REQUEST message (depending on resource availability for example) by sending a DETACH ACCEPT message, provided that the DETACH REQUEST message is not due to the device having been switched off, e.g. by a user of the device holding down a power-off button on the device.
2) In a network-originated detach procedure, the network sends a DETACH REQUEST message to the device, and the device acknowledges the DETACH REQUEST message by sending a DETACH ACCEPT message to the network.

While both the above mechanisms seem viable solutions, it should now be appreciated that in the following situations detach signalling has limited usefulness:

a) a situation in which the device attaches so that it can transmit a data transmission that is smaller than an average transmission by devices in the system;

b) a situation in which multiple devices are allocated or assigned (e.g. by the network) different communication windows, and at the end of its communication window each device will not communicate any longer with the network until the next-occurring communication window;

c) a situation in which the device is assigned or allocated a grant time interval, and at the end of the grant time interval the device will not communicate any longer with the network until the next grant time interval.

Additionally, both mechanisms 1 and 2 above require a signalling connection. In particular, when the device and the network are not connected any longer (for example after a loss of radio connection e.g. due to a poor signal path condition), additional signalling is required to again establish such signalling connection.

According to all of these considerations, increased signalling will arise when an increased number of devices are deployed in the communication system, and in particular when a large number of MTC-type devices are deployed in the communication system.

In GSM/GPRS and UMTS systems, an ATT flag (transmitted on a broadcast channel (BCCH) as part of System Information) can indicate to a device whether or not a detach procedure is actually required. This flag can potentially give a limited possibility for the network to reduce signalling load due to devices detaching. 3GPP technical specification document TS 24.008, sub clause 4.3.4 states:

"In A/Gb mode and GERAN Iu mode, a flag (ATT) broadcast in the L3-RR SYSTEM INFORMATION TYPE 3 message on the BCCH is used by the network to indicate whether the detach procedure is required. The value of the ATT flag to be taken into account shall be the one broadcast when the mobile station was in MM idle. In UTRAN Iu mode, a flag (ATT) in the CS domain specific system information element is used by the network to indicate whether the detach procedure is required. The value of the ATT flag to be taken into account shall be the one received when the mobile station was in MM idle."

CITATION LIST

Non Patent Literature

NPL 1: 3GPP TR 23.888 v1.6.0 (20011-11)

SUMMARY OF INVENTION

Technical Problem

However, it appears that most current network deployments do not use this ATT flag. Moreover and importantly, it should now be recognized that the ATT flag is common to all devices, i.e. addressed to all devices in the system, so does not provide any way to eliminate/avoid a detach procedure for any one or more device of a subgroup of devices in the system or a subgroup of all devices connected to the network or to a base station. Such a group comprises MTC devices.

Also, this ATT flag was not incorporated into the Evolved Packet System standard (EPS), and therefore an EPS-enabled device, in order to initiate a detach in EPS mode, must always communicate with the network via signalling when a detach is required.

As can be seen from the above, the increasing density of devices within wireless cellular networks and the foreseen rapid increase in the deployment of MTC devices both result in greatly increased occurrence of signalling in wireless cellular networks, causing network overload.

Present networks and wireless communication devices exhibit various disadvantages and limitations, and they offer no solution to this problem.

The invention seeks to provide wireless communication devices, a system and a method having advantages over known such devices, systems and methods. For example, aspects of the invention are directed to reducing the amount of signalling required to detach devices from a network.

Solution to Problem

Apparatus and methods will be described which provide for a wireless communication device that is specially configured to autonomously perform a detach operation. Apparatus and methods will be described which provide for a wireless communication device arranged to, in one mode, autonomously perform a detach operation and transmit a signal indicating the detach operation.

According to an aspect of the invention there is provided a wireless communication device (for example a terminal) for use in a wireless communication system, the device being arranged to autonomously initiate an implicit detach operation based on configuring information it has received.

Optionally and advantageously, the wireless communication device is arranged for transmitting, during a communication time interval, information intended for another wireless communication device (e.g. a network apparatus), and is arranged for autonomously performing a detach operation subsequent to the transmitting of information and without receiving any signalling associated with the detach operation.

Preferably, such a wireless communication device comprises means for receiving configuring information (for example, transmitted in a signal wirelessly by a network apparatus, or alternatively received during a manufacturing process or a post-manufacturing device configuration process), the configuring information indicating that the device shall be configured to so autonomously perform the detach operation and the device comprises means for, in response to the received configuring information, configuring itself to so autonomously perform the detach operation.

Preferably, the configuring information is addressed to, or intended for, a subset of one or more wireless communication devices that may include the device, and the device comprises means for determining whether it belongs to said subset and means for configuring itself to autonomously perform the detach operation when the determining is positive.

The subset may contain only one device or alternatively the subset may contain plural devices which may be only a portion of a total number of devices that may be connected to the network.

In one example, the subset comprises all MTC devices that may be connected to the network. Such selectivity allows certain devices (e.g. MTC devices as opposed to non-MTC devices) to be configured in this way while allowing other devices (e.g. user equipments or 'UEs' such as mobile telephones or data-centric devices such as terminals or tablets for internet-browsing) to be configured differently to the subset. The subset may comprise low-priority devices other than MTC devices e.g. mobile phones which are known to be seldom or infrequently used for making calls.

According to another aspect of the invention there is provided a wireless communication device (for example a network apparatus) which is arranged to identify another wireless communication device (e.g. by receiving a signal from the other wireless communication device, for example a wireless terminal, and identifying the other device e.g. by means of the received signal) and identify a detach configuration of the other device e.g. by means of the signal or alternatively by means of access to a database), the wireless communication device e.g. network apparatus comprising means for treating the identified other device e.g. terminal, depending on its detach configuration, as a device which can perform an implicit detach operation autonomously.

According to an embodiment, the wireless communication device (e.g. network apparatus) further comprises means for transmitting a configuring signal indicating that the other device (e.g. terminal) shall be configured to so initiate the detach operation autonomously. Preferably the configuring signal comprises configuring information defining a detach configuration for use by the other device for it to perform an implicit detach operation autonomously.

Optionally and advantageously, the configuring signal (e.g. sent by a network apparatus and received by a terminal) can indicate an explicit detach mode in which the other device (e.g. terminal) shall perform the detach operation at least partly by the other device transmitting a signal indicating the performing of the detach operation by the other device, and the other device is arranged to operate in this indicated explicit detach mode to autonomously perform the detach operation, the detach operation including transmitting the signal indicating the performing of the detach operation.

Optionally and advantageously, the configuring information received by a device (e.g. a terminal) can indicate an implicit or local detach mode in which the device shall not indicate the detach operation, the device being arranged to operate in the implicit or local detach mode to autonomously perform the detach operation without transmitting any signal indicating the performing of the detach operation.

Generally, the device may perform the detach operation by locally releasing a signalling connection, for example a NAS signalling connection.

A wireless communication device (e.g. terminal) is proposed that is arranged for communicating via a wireless link between the device and another wireless communication device and arranged to wirelessly transmit information intended for the other wireless communication device during at least part of a communication time interval and not outside the communication time interval.

Optionally such a wireless communication device (e.g. terminal) is also arranged to perform the detach operation by initiating termination of such a wireless link dependent on the transmission of the information by the device, for example subsequent to the transmission of the information. Alternatively, the device is arranged to perform the detach operation by initiating termination of the wireless link subsequent to the communication time interval.

The device may advantageously perform the detach operation without transmitting any indication of the detach operation being, or having been, performed.

The device can perform the detach operation independently from any DETACH REQUEST which the device may receive. It is envisaged that the device is advantageously arranged to initiate the detach operation without transmitting any DETACH REQUEST. However, optionally, the device may be arranged to initiate the detach operation by transmitting such a DETACH REQUEST. This allows a network to monitor or record the occurrence of the detach operation.

An advantage gained by aspects of the present invention described herein is that signalling associated with a detach operation is reduced significantly. This is particularly advantageous in a situation where a large number of devices are deployed in a network and therefore many devices may communicate with the network via signalling messages within a relatively small time interval or period. In such a situation, signalling overload is likely to occur, causing problems such as poor access, data congestion and increased latency. This situation is increasingly likely to occur due to the increasing deployment of devices in wireless communication networks. This applies particularly to increasing deployment of so-called machine-type communication (MTC) devices which are potentially much more numerous than other types of devices.

According to aspects of the present invention, it is possible for a wireless device to initiate a detach operation without explicitly indicating that a detachment is triggered. Further, the wireless device can autonomously decide to perform the detach operation. Signalling load can be reduced for such a device. Further, it becomes possible to perform a detach operation without using any signalling connection. This useful capability provides particular advantage in that it avoids re-establishment of a signalling connection when a signalling connection has been lost. Such a detach operation in which no indication of the detach operation need be provided may be termed an implicit detach operation, an implicit detach, an implicit detachment, a local detach operation, a local detach, or a local detachment.

This reduces signalling load of the network compared to a situation in which an explicit indication by or to the network is desired or required, as is commonly now the case.

A device (e.g. terminal) is proposed which is capable of autonomously performing an implicit detach operation and is capable, if desired or required, of autonomously performing an explicit detach operation by explicitly indicating the detach operation. The explicit indication is to another device, for example a network apparatus, with which the device is in constant or intermittent wireless communication. It should be understood that a device, whether it detaches implicitly or explicitly, can be, prior to the detachment, in intermittent communication with such another device by sending and/or receiving bursts or packets of data interspersed by periods in which no data is sent or received.

Figure 1:
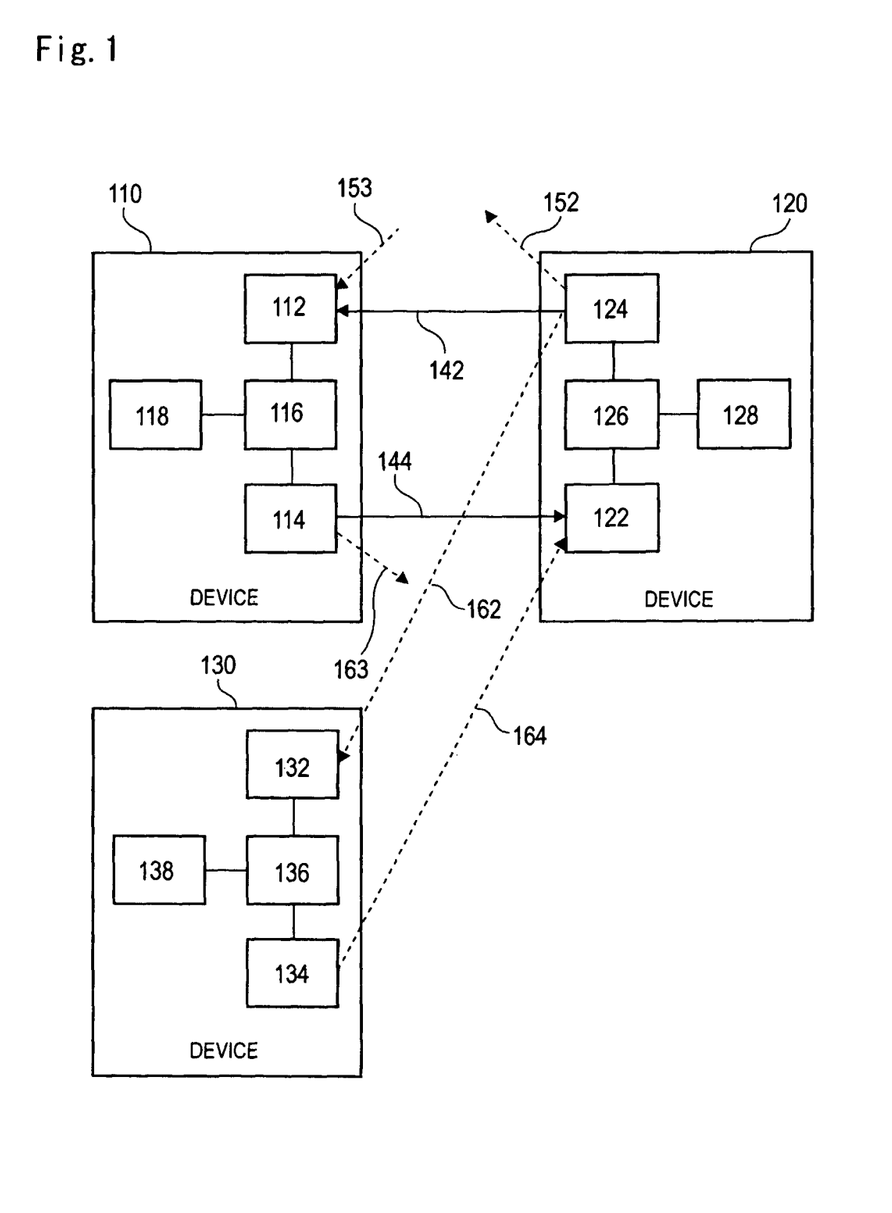
FIG. 1 shows two wireless communication devices arranged to communicate with another wireless communication device over a wireless link.

It should also be understood that the device (FIG. 1, 110) may be the only device in communication with another device (FIG. 1, 120) or the device may be one of plural such devices (FIG. 1, 110, 130) each in communication with the other device (FIG. 1, 120). The two or more devices 110, 130 do not necessarily form part of a network as generally understood, however it is envisaged that the inventive features are very useful when applied to a network e.g. a cellular wireless communication network.

Such a cellular network typically comprises base stations and switching centres and possibly other types of infrastructure equipment, as may be present in a wireless communication network such as a cellular mobile telephone network for example. Advantage may be gained when the device e.g. terminal is in communication with a network with which many other devices (e.g. terminals, mobile or fixed) may be in communication over a period of time. However, it should be understood that aspects of the present invention are also advantageous when the device is in communication with only one other device or a small number of other devices.

For a network application, the amount of signalling required during a period of time is reduced proportionate to the number of devices which are in communication with the network over that period of time. That said, aspects of the present invention provide for a reduction of the amount of signalling required even for the case where the device communicates with only one other device.

According to aspects of the present invention, a network may communicate with plural devices and the network can be configured to expect one or more of those plural devices to be detached during defined time intervals. The network may assign a (one or more) time interval to a device. Such an assigned time interval may be considered as a time slot or time window or communication window allocated to that device during which the device can or may communicate with the network. The network then expects that the device will not communicate with the network during any time interval other than the or an assigned time interval. In other words, the network treats the device as though the device will not communicate with the network during that time interval other than the one or more assigned time interval, such communication being by means of transmitting and/or receiving a signal.

Therefore, during the one or more other time intervals the network or other device will not transmit any signal intended for the device and will not actively monitor, or look for, any signal that may be transmitted by the device e.g. terminal. In particular, there will be no need for any signalling between the network/other device and the device during the one or more other time interval(s) (outside the assigned time interval) and there will be no need for any signalling to terminate the communication that occurs during the assigned time interval.

Thus, there will be no need for any signalling in order to perform a detach operation, and there will be no need for any signalling to indicate a detach operation unless it is desired or required that the device indicates that it performs (has performed, is performing or will perform) a detach operation (according to the above-described explicit detachment procedure).

The network or other device may assign a shared time interval, as exemplified by the above-mentioned Grant Time Interval, to plural devices (a group or set of devices) so that the plural devices share the assigned shared time interval and can each communicate with the network during the assigned shared time interval. The above-mentioned Grant Time Interval will be discussed further below in relation to embodiments.

In a situation in which such a shared time interval is employed, aspects of the present invention provide great advantage because the amount of signalling required for a detach operation is reduced according to the number of plural devices sharing the shared time interval. Any device as claimed herein which shares the shared time interval does not need to communicate via signalling to perform a detach operation. Preferably the network knows or expects that the device will be detached during any time interval outside the shared time interval.

In a situation in which a sub time interval (within the shared time interval) is employed (e.g. the 'communication window' described above), aspects of the present invention provide great advantage because the amount of signalling required for a detach operation is reduced proportionate to the number of devices that are connected to the network.

According to an embodiment, a device can be configured to perform either an implicit detach procedure or an explicit detach procedure, each described above, and can be configured to do only one or either of these, the device being configured either during manufacture or after manufacture during a device configuration or setting process e.g. via EPROM. Such a configuration would be typically performed prior to the device being used or employed/deployed in a real network.

Alternatively and advantageously, such a device can be configured to perform an implicit detach procedure as described above depending on an indication which it receives from another device (e.g. an indication originating from a core network entity and transmitted by a base station). This configurability allows the configured device to be deployed along with another device or network that does not desire or require an explicit detach procedure and which is arranged to operate according to the above-described implicit detach procedure.

Optionally in addition such a device can be configured to perform an explicit detach procedure as described above depending on an indication which it receives from another device (e.g. an indication originating from a network apparatus such as a core network entity). This configurability also allows the configured device to be deployed with another device or network that does desire or require an explicit detach procedure and/or which is not capable of operating according to the implicit detach procedure.

Advantageously, such a device can be configured to perform either an implicit detach procedure or an explicit detach procedure as described above depending on an indication which it receives from the other device e.g. network apparatus. For example, the other device may send an indication e.g. a flag indicating one of two indicated states (e.g. a logical "0" may indicate implicit detach and a logical "1" may indicate explicit detach.) The device receiving the indication is able to respond to the indication in accordance with the indication.

According to a variant of this, the other device may indicate an explicit detach and also indicate whether the device (addressed by the indication) shall or should autonomously initiate a detach operation.

According to a sub-variant of the above variant, alternatively the other device e.g. network may indicate an explicit detach and also indicate that the other device shall or should perform a detach operation and the device (addressed by the indication) should not autonomously perform a detach operation.

This capability provides potential backward compatibility with existing or legacy other devices or networks. When such an approach is applied to a network, the network only has to configure a new device once and then the device (capable of being so configured) will be responsible for detaching autonomously. This has a result that the network does not have to monitor attach/detach state of all devices with which it can communicate. Also advantageously it can operate with new capable devices and also with legacy devices (not capable of being so configured).

According to an embodiment of a device, suitable for use in a wireless cellular terminal, a configuring signal is addressed to a subset of one or more wireless communication devices that may include the device, and the device comprises means for determining whether it belongs to said subset and means for configuring the device to autonomously initiate a detach operation when the determining is positive, i.e. it is determined that that device belongs to the subset.

According to aspects of the invention, it is advantageous to be able to address only a group of devices, for example all accessible MTC devices, by means of the configuring signal, as will be explained further below.

According to an embodiment, the configuring signal comprises an Open Mobile Alliance Device Management (OMA DM) message or a Universal Subscriber Identity Module Over The Air (USIM OTA) message or a Universal Subscriber Identity Module (USIM) file.

The configuring signal may comprise NAS signalling between the network and the device, such as an ATTACH ACCEPT message.

Advantageous Effects of Invention

As will be appreciated, the present invention can advantageously provide for a reduced amount of signalling in a wireless communication system, and provide for a reduced signalling capacity requirement for detach operation in a wireless communication system.

Further features and advantages of the invention are set forth in the following specific description of embodiments that are described, by way of example only, with reference where appropriate to the appended drawings of which FIGS. 6 to 9 illustrate embodiments of the invention.

DESCRIPTION OF EMBODIMENTS

It should be understood that FIGS. 1 to 5 apply both to a known wireless communication system and also to aspects of the present invention described herein and are used to describe operation according to a known wireless communication system and also to describe operation of a device employing one or more of the inventive features described herein. Further, it should be understood that FIGS. 6 to 9 apply to embodiments and aspects of the present invention described herein.

The term 'wireless communication device' herein means a device arranged to communicate wirelessly with another device that is also arranged to communicate wirelessly. The term 'wireless communication device' encompasses, but is not limited to, a wireless terminal of a wireless cellular communication system comprising at least one base station and at least one, typically plural, wireless terminals.

In FIG. 1, a wireless communication device 110 comprises a receiver 112, a transmitter 114, a processor 116 coupled to the receiver 112 and to the transmitter 114, and a memory 118 coupled to the processor 116. The processor 116 is configured to control the receiver 112 and the transmitter 114 according to instructions contained in the memory 118.

The receiver 112 of the device 110 is arranged for receiving, via a wireless link 142, signalling data transmitted by another device 120. The transmitter 114 of the device 110 is arranged for transmitting signalling data via a wireless communication link 144 and is arranged for performing transmission of information intended for one or more other device(s) (not shown) via one or more other wireless links 163. The communications link 142 used by the receiver 112 and the communication link 144 used by the transmitter 114 can be considered as the same communication link. Alternatively, the wireless communication link 142 used by the receiver 112 can be considered as one link and the wireless communication link 144 used by the transmitter 114 can be considered as another communication link. For example, the link 142 used by the receiver 112 can be considered as a down link and the link 144 used by the transmitter 114 can be considered as an uplink. Such use of communication links for transmitting and receiving signals are well known in the art and need not be discussed further.

The other wireless device 120 comprises a receiver 122, a transmitter 124, a processor 126, and a memory 128. The functions of the receiver 122, transmitter 124, processor 126 and memory 128 of the other device 120 are similar to the respective functions of the receiver 112, transmitter 114, processor 116 and memory 118 of the device 110. In use, the other device 120 wirelessly transmits, via its transmitter 124 and wireless link 142, signals that are intended for the receiver 112 of the device 110. Similarly the transmitter of device 110 transmits one or more signals wirelessly that are intended for the other device 120 via transmitter 114 and wireless link 144. The receivers 112, 122 of the respective devices 110, 120 are arranged for receiving the signals transmitted by the respective transmitters 124,114.

As shown by dashed arrows 153, 164, the respective receivers 112, 122, can receive signals transmitted by one or more further devices (one such further device being shown as further device 130). That is, each receiver can receive more than one signal, transmitted either by different devices or by a single device. Similarly, the transmitter 114 can transmit signals intended for one or more further devices, as shown by dashed arrow 163, and the transmitter 124 can transmit signals intended for one or more further devices, as shown by dashed arrows 152 and 162.

To illustrate more clearly this idea of a device communicating with more than one other device, FIG. 1 shows that the further device 130 comprises a receiver 132, a transmitter 134, a processor 136 and a memory 138. The receiver, transmitter, processor, and memory of the further device 130 have similar functions to the corresponding respective elements of the device 110 and other device 120 and will therefore not be described further.

As can be seen from the dashed arrows 162, 164 extending between the other device 120 and the further device 130, the other device and the further device can be in communication with one another by means of the respective transmitters and receivers. In one example, the other device 120 may form part of a base station of a cellular communications network and the device 110 and the further device 130 may be, or may be included in, respective cellular wireless terminals. However, it should be understood there may exist only two devices, illustrated as the device 110 and the other device 120 in FIG. 1. A wireless communication system comprising only two such devices or a small number of devices can benefit from the claimed features.

It should also be understood that in FIG. 1, the other device 120 is not necessarily part of a network as commonly understood. That is, the presence of network components such a mobile switching centres, known in the art, may not be required. Nevertheless, it is envisaged that the claimed inventive features will be useful when applied to a wireless communication network comprising one or more base stations and a plurality of wireless terminals. In such an application the device 110 would form part of such a wireless terminal and the other device 120 would form part of such a base station.

Figure 2:
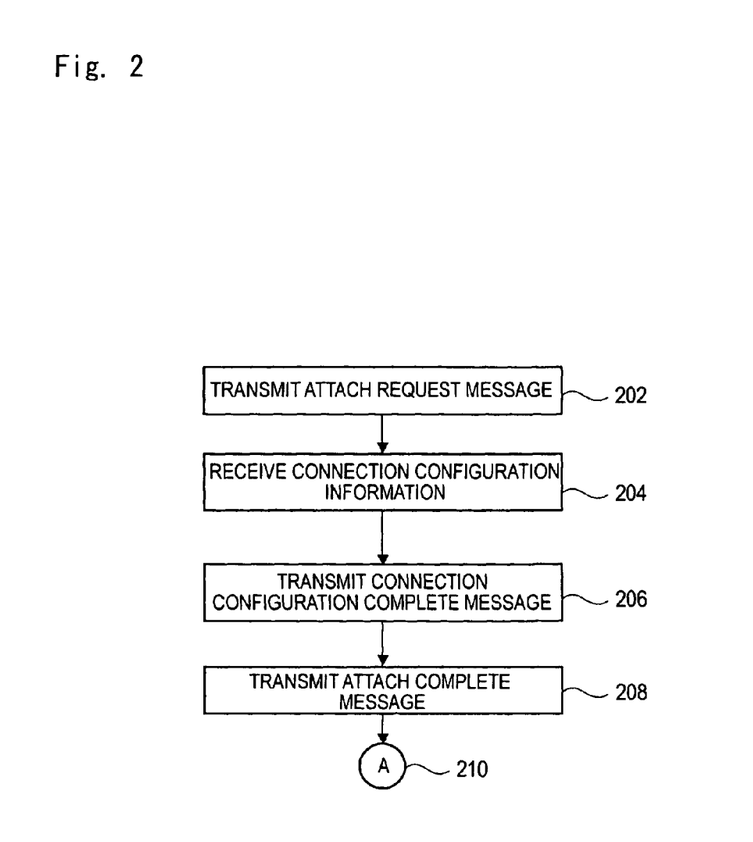
FIG. 2 shows a known procedure for establishing a wireless link between two wireless communication devices.

FIG. 2 shows a procedure for establishing a wireless link between two wireless communication devices. In step 202 an ATTACH REQUEST message is transmitted. For example, a device (FIG. 1, 110) may transmit the ATTACH REQUEST message for another device (FIG. 1, 120). The message transmitted by the device may be received by the receiver of the other device.

In step 204, connection configuration information is received, for example the information is received by the receiver 112 of the device 110 of FIG. 1. Next, a connection configuration complete message is transmitted in step 206. For example, the connection configuration complete message is transmitted by the transmitter 114 of the device 110 of FIG. 1.

Next, in step 208, an ATTACH COMPLETE message is transmitted. For example, the ATTACH COMPLETE message is transmitted by the transmitter 114 of the device 110 of FIG. 1.

As a result of the steps 202, 204, 206, 208 attachment is achieved whereby a communications link is established between the two devices, indicated by letter 'A' 210.

Figure 3:
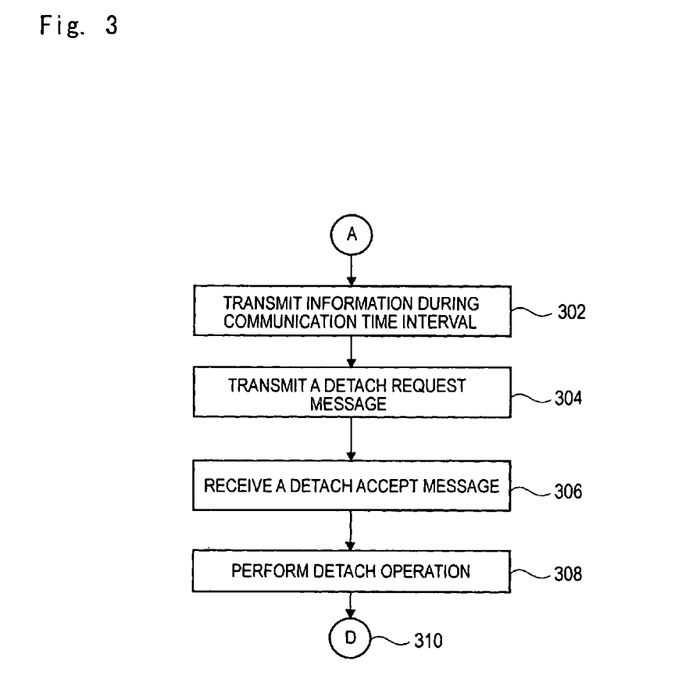
FIG. 3 shows a known detach procedure initiated and executed at least partly by the same device.

FIG. 3 shows a detach procedure initiated by a device (the device 110 of FIG. 1) and at least partly executed by the same device. In an attached state indicated by letter 'A' (corresponding to the letter A of FIG. 2), a wireless link has been established between the device and another device (FIG. 2, 120). In step 302, information is transmitted via a wireless link by the device during a time interval defined for such communication, i.e. during a communication time interval. Such transmitted information can be any kind of information. In this example the transmitted information is digital data. Next, in step 304 a DETACH REQUEST message is transmitted by the device.

Next, in step 306, a DETACH ACCEPT message is received by the device. For example, the other wireless device (FIG. 1, 120) may receive the transmitted DETACH REQUEST message and may then transmit the DETACH ACCEPT message for receipt by the device (FIG. 1, 110) which transmitted the DETACH REQUEST message.

Next, in step 308, a detach operation is performed by the device. For example, the detach operation is initiated or performed by the device terminating the transmitting and receiving of signalling information via the wireless link, thereby releasing a signalling connection between the device (FIG. 1, 110) and the other device (FIG. 1, 120).

The above-described steps 302, 304, 306 and 308 cause the device to be in a detached state i.e. the steps result in termination of the wireless link, indicated by state 'D' 310.

Figure 4:
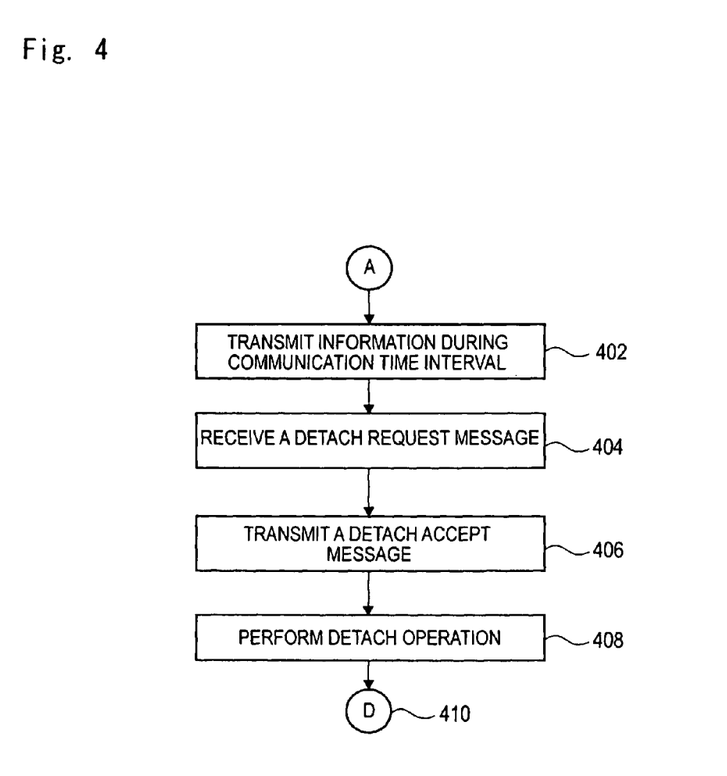
FIG. 4 shows a known detach procedure executed at least partly by a device and initiated by another device.

FIG. 4 shows a detach procedure performed at least partly by a device and initiated by another device. The detach procedure may be initiated by the other device (FIG. 1, 120) and at least partly executed on the device (FIG. 1, 110). As can be seen from FIG. 4, the steps of FIG. 4 are essentially the same as the steps of FIG. 3, except that in FIG. 4 the DETACH REQUEST message is transmitted by the other device and received by the device (whereas, in FIG. 3 the DETACH REQUEST message is transmitted by the device and received by the other device). Also, in FIG. 4 the DETACH ACCEPT message is transmitted by the device and received by the other device, whereas in FIG. 3 the DETACH ACCEPT message is transmitted by the other device and received by the device.

In a case where the device is a mobile cellular terminal and the other device is a cellular network apparatus (e.g. part of a base station), FIG. 3 represents steps of a so-called mobile-originated detach procedure and FIG. 4 represents steps of a so-called network-originated detach procedure.

As indicated by the letter D 410 the steps of FIG. 4 result in a detached state, i.e. wireless link termination as for FIG. 3.

The steps shown in FIGS. 3 and 4 represent two alternative respective procedures employed in a typical cellular communications network.

Figure 5:
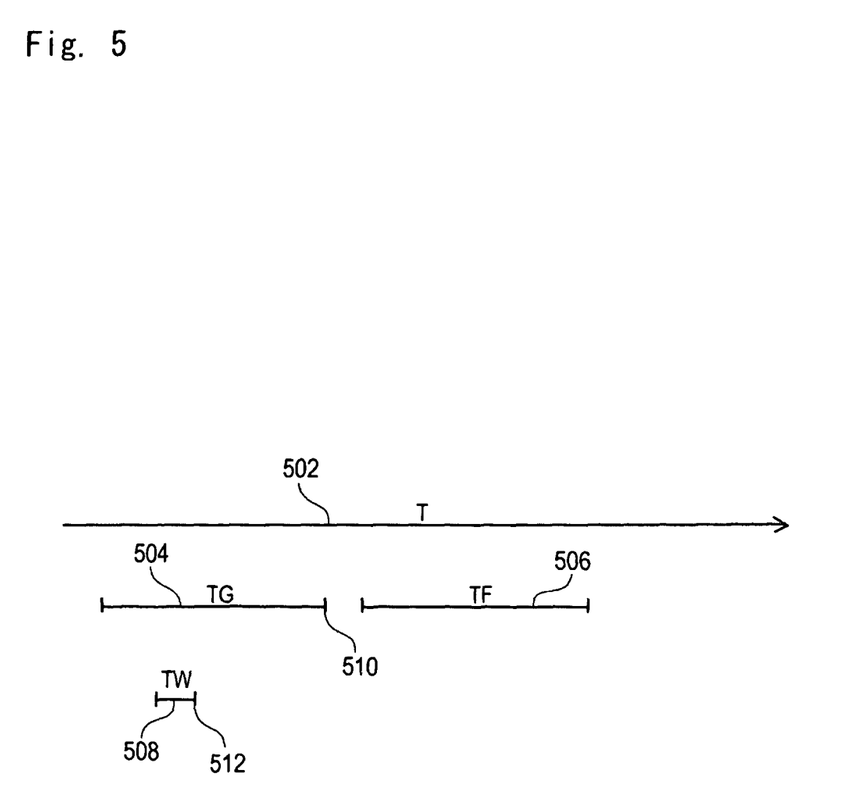
FIG. 5 is a timing diagram illustrating relative timings of time intervals defined in a proposed wireless communication system.

Turning to FIG. 5, a timeline 502 represents time on a horizontal axis and three time intervals 504, 506 and 508 defined by their relative positions relative to the timeline 502. A grant time interval 504 is a time interval allocated to a device for the device to communicate during the grant time interval. A forbidden time interval 506 is a time interval defined in which the device is not intended to communicate. A communication time window 508 defines a time interval which is a portion of the grant time interval 504, during which one or more devices are intended to communicate. The end of the transmission time window 508 is indicated by label 512.

Figure 6:
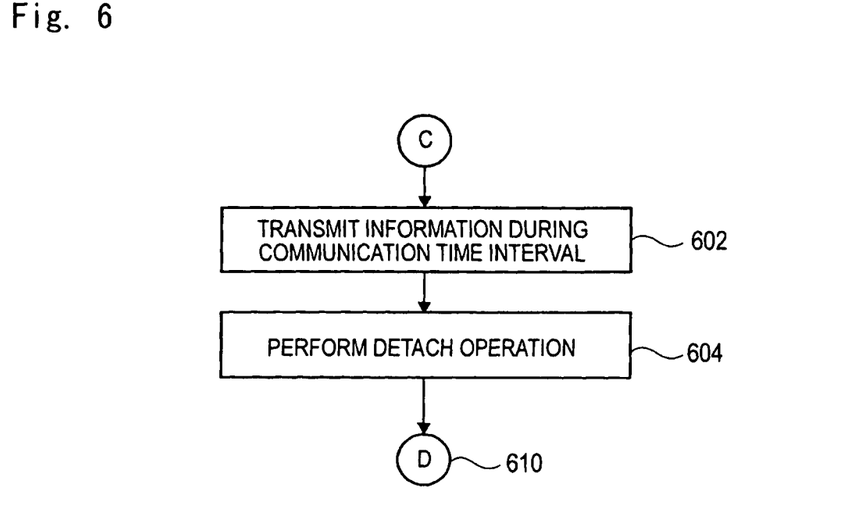
FIG. 6 shows a procedure that can be performed by a wireless communication device to autonomously perform an implicit detach operation.

FIG. 6 shows a procedure that can be performed by a wireless communication device to perform a detach operation. At the start of the procedure a link has been established between a device (FIG. 1, 110) and another device (FIG. 1, 120), indicated by letter 'C'. In step 602, information is transmitted by the device during a communication time interval (for example, either the grant time interval 504 or the communication window 508 shown in FIG. 5). Next, in step 604, a detach operation is performed by the device. The detach operation results in termination of the communication link, indicated by letter 'D' 610. As can be appreciated when comparing FIG. 6 with FIGS. 3 and 4, there are no steps in FIG. 6 corresponding to receiving or transmitting (FIG. 3, 304, 306 respectively) any signalling messages associated with detachment, that is, there is no DETACH REQUEST message and there is no DETACH ACCEPT message. The process shown in FIG. 6 is thus independent of any such DETACH REQUEST message or DETACH ACCEPT message, as enabled by the inventive features which will be explained in more detail below.

The device, as explained above, can be configured during or after its manufacture to autonomously perform a detach operation. Alternatively or in addition, the device can be configured via a configuring signal sent via a communication link between the device and the other device.

Figure 7:
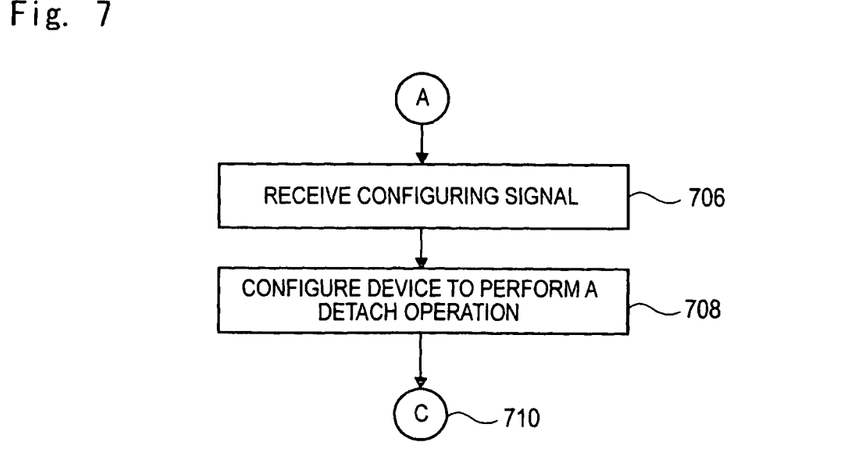
FIG. 7 shows a configuration procedure that can be performed by a wireless communication device to perform configuration of the device to autonomously perform an implicit detach operation.

Turning to FIG. 7, a procedure is shown for configuring a device by means of a configuring signal so that it can autonomously perform a detach operation, such an initiation being depicted by step 604 of FIG. 6. In step 706 of FIG. 7, a configuring signal is received which indicates that the device receiving the signal shall be configured to perform a detach operation autonomously. Next, in step 708, the device receiving the configuring signal responds to the receiving of the configuring signal by configuring the device to perform a detach operation. The configuring of the device allows the device to perform the procedure shown by FIG. 6. The device, when it has been configured according to the process shown in FIG. 7 is in a configured state shown by the letter 'C' 710 which corresponds to letter 'D' 610 shown in FIG. 6.

Figure 8:
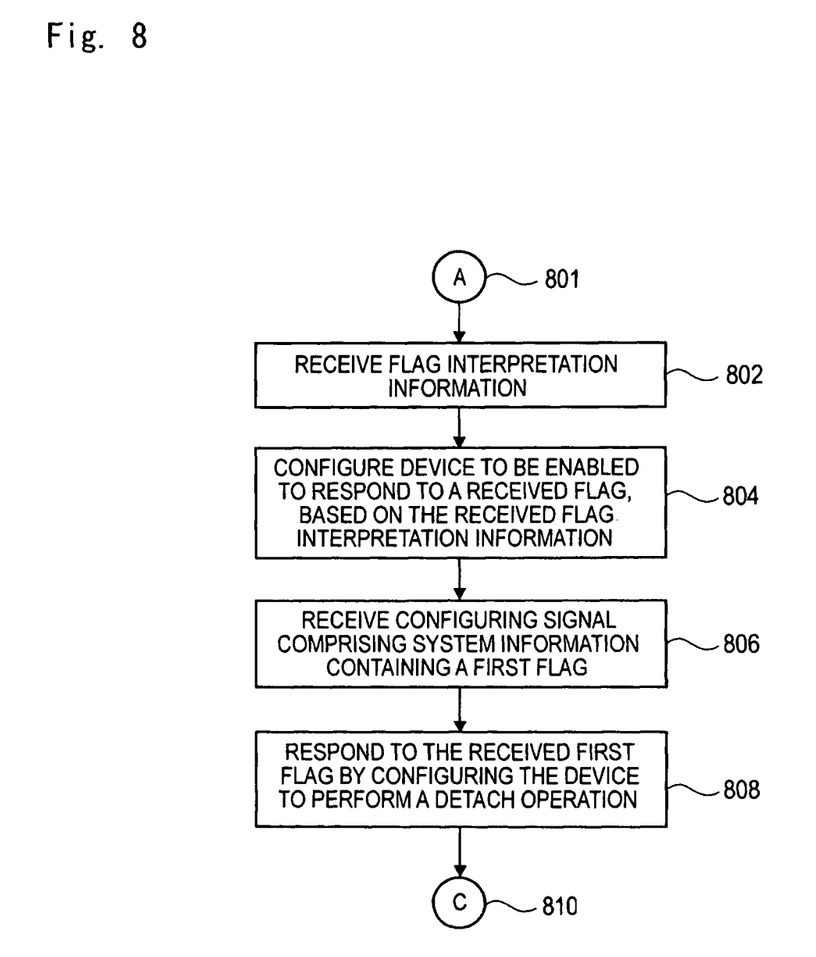
FIG. 8 shows another configuration procedure more detailed than that shown in FIG. 7.

Turning to FIG. 8, in step 802 flag interpretation information is received by a device, for example in the form of a message in a signal received by the device.

In step 804, the device receiving the flag interpretation information is configured to be enabled to respond to a received flag which it may receive, the configuration being based on the received flag interpretation information.

Next, in step 806, a configuring signal is received (as performed in step 706 of FIG. 7). The configuring signal comprises, in this example, system information transmitted on a broadcast channel and containing a first flag.

Next, in step 808 the device is configured (e.g. the device comprises means to configure itself), in response to the received first flag, so that the device can perform a detach operation as depicted in step 604 of FIG. 6.

Thus, when the steps of FIG. 8 have been performed, the device is in a configured state shown by letter 'C' 810, corresponding to letter 'D' 610, "C"710 shown in FIGS. 6 and 7 respectively.

Figure 9:
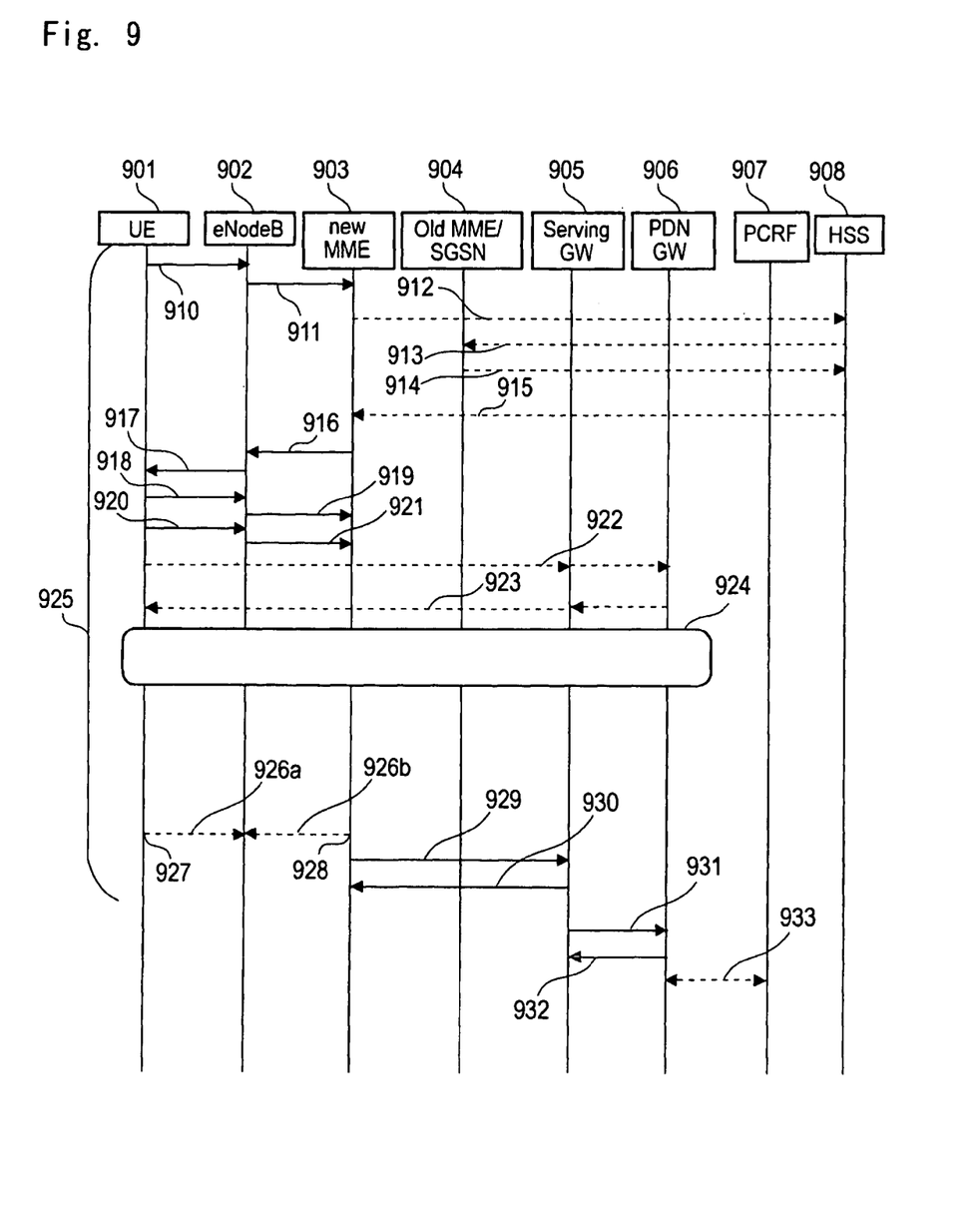
FIG. 9 is an event diagram which shows an implementation of a new detach procedure in a 3GPP communication system.

FIG. 9 is an event diagram which shows an implementation of a new detach procedure in a 3GPP communication system. The event diagram shows relative timings and directions of signals transmitted between a wireless communication device (a terminal) and a network apparatus of the 3GPP communication system during first an attach procedure and then a detach procedure. Note that when referring to a procedure, lower case is generally used, while for the name of messages upper case is generally used.

Communication entities within the wireless communication system are shown at the top of the event diagram and comprise: a wireless terminal 901 (labelled as "UE" for user equipment, although typically the new detach procedure would be used to detach a device not operated by a user), an evolved node B 902, an MME 903, an old MME/SGSN 904, a serving gateway 905, a PDN gateway 906, a PCRF 907, and a HSS 908. The functions of these entities are described in various 3GPP wireless communication standards documents including 3GPP TS 23.401.

During the attach procedure the terminal 901 becomes attached to the network. During the DETACH (or detachment) process or procedure the terminal 901 becomes detached from the network.

At the start of the process at the beginning of the attach procedure, the terminal 901 transmits an ATTACH REQUEST message 910 intended to be received by the network. The ATTACH REQUEST message 910 is received by evolved node B 902 which forwards the message as Attach Request message 911 to the new MME 903. The new MME 903 then transmits an Update Location Request 912 which is eventually received by the HSS 908.

The HSS 908 then transmits a Cancel Location message 913 which is received by the old MME/SGSN 904. The old MME/SGSN 904 then transmits a Cancel Location Acknowledgment message 914 which is received by the HSS 908. The HSS 908 then transmits an Update Location Acknowledgement message 915 which is received by the new MME 903. The new MME 903 then transmits an Initial Context Setup Request/ATTACH ACCEPT message 916 which is received by the evolved node B 902. The evolved node B 902 then transmits a RRC Connection Reconfiguration message 917 which is received by the terminal 901.

The terminal 901 then transmits a RRC Connection Reconfiguration complete message 918 which is received by the evolved node B 902. The evolved node B 902 then transmits an Initial Context Setup Response message which is received by the new MME 903.

The terminal 901 then transmits a Direct Transfer message 920 to the evolved node B 902 and the evolved node B 902 transmits, in response to receiving the Direct Transfer message, an ATTACH COMPLETE message 921 which is received by the new MME 903. At this point in the procedure, an attachment has been performed and data can be exchanged by transmission between the terminal 901 and the network (HSS 908). Such transmission of data is indicated by first uplink data 922 transmitted by the terminal 901, and first downlink data 923 received by the terminal 901. Thus, a small data transmission occurs, indicated by rectangle 924.

The remainder of the procedure shown in FIG. 9 comprises steps of the detach (or detachment) procedure or process. Initially, a signalling connection release occurs, indicated by arrows 926*a* and 926*b*. Either the terminal 901 or the network (HSS 908) effectively detach implicitly thus causing the wireless communication link between the terminal and the network to be broken or terminated, indicated by intersection points 927, 928. In this case where the terminal detaches implicitly, the new MME 903, in response to the implicit detachment, transmits a Delete Session Request 929 which is received by the serving gateway 905. The serving gateway 905 then transmits a Delete Session Response 930 which is received by the new MME 903.

Following this, a further Delete Session Request is forwarded (transmitted) by the serving gateway 905, the Delete Session Request being intended for the network. Following this, the serving gateway 905 receives a Delete Session Response 932 from the network, which results in a PCEF initiated IP-CAN Session Termination 933.

Example parameters forming part of a detach procedure will now be described which illustrate how the inventive features might be put into practice to provide an improved detach procedure. The parameters can be sent in signalling (e.g. NAS signalling) such as an ATTACH ACCEPT message, or can be part of a Management Object (OMA DM) or can be part of a USIM file.

Parameter 1: Type of detach:

a) IMPLICIT: implicit detach, i.e. the device locally or implicitly detaches, potentially locally releasing the existing NAS signalling connection. With this option, there is no NAS (Non-Access Stratum) signalling sent between the network and the device in either direction; or b) EXPLICIT: explicit detach, i.e. the device or the network has to send explicit signalling for the detach, via the usual sending of DETACH REQUEST message, and the recipient has to send a DETACH ACCEPT message. This is in keeping with procedure that is used in currently-deployed networks. According to current procedure, the network does not send the parameter, "Type of Detach", i.e. implicit or explicit. In current procedures the network sends a detach type, but this does not indicate whether the detach should be implicit or explicit. Note: when the device is configured to autonomously detach, and the specified type of detach is "EXPLICIT", the device will operate independently of the "ATT flag" in GSM/GPRS or UMTS system information. It is proposed that the wireless terminal shall ignore the ATT flag it receives.

Parameter 2: Originator of detach (needed in case the above configuration is EXPLICIT)
a) YES: the device is responsible for triggering the detach.
b) NO: Network is responsible for triggering the detach.
Currently either the wireless terminal device or the network can initiate the detach, but there is no configuration of the device to let the device know whether the device or the network will be responsible for the detach.

Parameter 3: Timing of detach:
This timing can be for example "end of grant time", "end of communication window", "end of data transfer of data (between the device and the network or other device)", "expiry of periodic registration update", "signalling connection release", or simply a duration (e.g. a time-out value).

Having described the above parameters, there will now be described, by way of examples listed below, different ways by which a configuration of a device can be performed so that it can perform a detach operation autonomously.

1) The configuration can be performed via OMA DM or USIM OTA for initialization purposes or when the configuration is assumed to be rather static.

2) The configuration can be performed via NAS signalling when the configuration has to be more dynamic, or when changes in the configuration have to be taken into account quickly. For example, the configuration could be provided in the ATTACH ACCEPT message sent to the device when it attaches to the network.

3) The configuration could also be done via System Information but this would be less optimal or more static and the advantage of a per-device configuration would be lost. Having said that, the configuration for implicit or explicit detach could still be done via a new ATT-for-MTC flag (for example, as single bit of data) in System Information, dedicated to machine type devices, with the same properties as the existing ATT flag. The device could then be configured via OMA DM or USIM OTA to read this new flag or not, and it would be the combination of such configuration and the SI flag that would guide the device to the appropriate behaviour, as detailed below:

If the device is configured to read the new ATT-for-MTC flag and the ATT-for-MTC flag indicates that no detach indication is required to be made by the device, then the device implicitly detaches and there is no need for NAS signalling to the network, If the device is configured to read the new ATT-for-MTC flag and the ATT-for-MTC flag indicates that indication of detach is required to be made by the device, or if the device is not configured to read the new ATT-for-MTC flag, then the device would have to detach explicitly towards the network.

It should be understood that the invention may be implemented in software and/or in hardware. If it is implemented in software, the software may be provided on a carrier medium such as, for example, CD ROM, electronic memory or a signal transmitted over a computer network. The software may be integrated with software or programming code for performing functions other that the functions relating directly to the claimed features. The software may not exist as a separate module and it may be integrated with an operating system for a computer or processor.

This application is based upon and claims the benefit of priority from United Kingdom patent application No. 1205828.5, filed on Mar. 30, 2012, the disclosure of which is incorporated in its entirety by reference.

INDUSTRIAL APPLICABILITY

The present patent application relates to wireless communication between devices, and to signalling associated with one or more wireless communication devices performing a detach operation whereby a wireless communication link is terminated.

REFERENCE SIGNS LIST

110 device
112 receiver
114 transmitter
116 processor
118 memory
120 device
122 receiver
124 transmitter
126 processor
128 memory
130 device
132 receiver
134 transmitter
136 processor
138 memory

What is claimed is:

1. A user equipment (UE) for communicating wirelessly with another device in a wireless communication system, the UE being arranged to:
   receive at least one of an ATTACH ACCEPT message, a LOCATION UPDATING ACCEPT message, a ROUTING AREA UPDATING ACCEPT message and a TRACKING AREA UPDATING ACCEPT message, wherein said at least one of an ATTACH ACCEPT message, a LOCATION UPDATING ACCEPT message, a ROUTING AREA UPDATING ACCEPT message and a TRACKING AREA UPDATING ACCEPT message comprises at least one parameter that defines a type of detach procedure to be an implicit detach procedure; and
   perform a detach procedure, wherein the detach procedure comprises performing, autonomously, an implicit detach operation to terminate a communication link between the UE and the another device, wherein said implicit detach operation is performed, subsequent to an end of a communication time interval, based on said at least one parameter that defines the type of detach procedure.

2. The UE according to claim 1, further arranged to, when the detach procedure includes an explicit detach mode, transmit an indicating signal indicating the detach operation.

3. The UE according to claim 2, wherein the indicating signal transmitted by the UE comprises a DETACH REQUEST message serving to indicate that a detach operation is to be performed.

4. The UE according to claim 1, further comprising storage unit that receives and stores the at least one parameter that defines the type of detach procedure and for storing program information comprising instructions, and a processor coupled to the storage unit and arranged to so-autonomously perform the detach operation by carrying out the stored instructions using the stored at least one parameter that defines the type of detach procedure.

5. The UE according to claim 1, wherein the message that comprises at least one parameter that defines the type of detach procedure is addressed to a subset of one or more wireless communication UE that may include the UE, and the UE comprises a unit that determines whether the UE belongs to said subset and a unit that configures the UE when the determining is positive.

6. The UE according to claim 1, wherein the message that comprises at least one parameter that defines the type of detach procedure comprises non-access stratum (NAS) signaling.

7. The UE according to claim 1, wherein the message that comprises at least one parameter that defines the type of detach procedure comprises an Open Mobile Alliance Device Management (OMA DM) message or a Universal Subscriber Identity Module Over The Air (USIM OTA) message or a Universal Subscriber Identity Module (USIM) file.

8. The UE according to claim 1, wherein the message that comprises at least one parameter that defines the type of detach procedure comprises system information transmitted on a broadcast channel.

9. The UE according to claim 8, wherein the system information comprises an attach flag associated with a subset of UEs, the subset comprising one or more of a set of all wireless communication UEs that can operate in the wireless communication system, the subset including the UEs, and the UEs comprises a unit that determines that it belongs to said subset and the UEs comprises a unit that autonomously performs the implicit detach operation in response to said determining.

10. The UE according to claim 9, wherein the UE is arranged to receive a flag-reading configuration signal and the UE is arranged to be enabled by the flag-reading configuration signal to read the attach flag.

11. The UE according to claim 10, wherein the flag-reading configuration signal comprises an Open Mobile Alliance Device Management (OMA DM) message or a Universal Subscriber Identity Module Over the Air (USIM OTA) message or a Universal Subscriber Identity Module (USIM) file.

12. A method for use in a UE for communicating wirelessly with another device in a wireless communication system, the method comprising:
receiving at least one of an ATTACH ACCEPT message, a LOCATION UPDATING ACCEPT message, a ROUTING AREA UPDATING ACCEPT message and a TRACKING AREA UPDATING ACCEPT message, wherein said at least one of an ATTACH ACCEPT message, a LOCATION UPDATING ACCEPT message, a ROUTING AREA UPDATING ACCEPT message and a TRACKING AREA UPDATING ACCEPT message comprises at least one parameter that defines a type of detach procedure to be an implicit detach procedure; and
performing, autonomously, an implicit detach operation serving to terminate a communication link between the UE and the another device, wherein said implicit detach operation is performed, subsequent to an end of a communication time interval, based on said at least one parameter that defines the type of detach procedure.

* * * * *